US008666589B2

(12) United States Patent
Munnix

(10) Patent No.: US 8,666,589 B2
(45) Date of Patent: Mar. 4, 2014

(54) DEVICE AND METHOD FOR DETERMINING THE DRIVING STATE OF A VEHICLE

(75) Inventor: Pascal Munnix, Berg (DE)

(73) Assignee: Pascal Munnix, Berg (DE)

( * ) Notice: Subject to any disclaimer, the term of this patent is extended or adjusted under 35 U.S.C. 154(b) by 319 days.

(21) Appl. No.: 13/002,923

(22) PCT Filed: Jul. 9, 2008

(86) PCT No.: PCT/EP2008/005610
§ 371 (c)(1),
(2), (4) Date: Jan. 6, 2011

(87) PCT Pub. No.: WO2010/003437
PCT Pub. Date: Jan. 14, 2010

(65) Prior Publication Data
US 2011/0246020 A1 Oct. 6, 2011

(51) Int. Cl.
B60W 40/10 (2012.01)
G01C 21/16 (2006.01)

(52) U.S. Cl.
USPC .......................... 701/30.7; 701/30.2

(58) Field of Classification Search
None
See application file for complete search history.

(56) References Cited

U.S. PATENT DOCUMENTS

| 6,421,622 | B1 | 7/2002 | Horton et al. |
| 6,449,559 | B2 * | 9/2002 | Lin ................................ 701/472 |
| 7,193,559 | B2 * | 3/2007 | Ford et al. ................ 342/357.32 |
| 7,239,949 | B2 * | 7/2007 | Lu et al. ........................... 701/45 |
| 2003/0216865 | A1 | 11/2003 | Riewe |
| 2005/0065727 | A1 | 3/2005 | Hu et al. |
| 2005/0234644 | A1 | 10/2005 | Lin |
| 2007/0213889 | A1 * | 9/2007 | Parra Carque ................... 701/7 |
| 2008/0091351 | A1 | 4/2008 | Hoshizaki |

FOREIGN PATENT DOCUMENTS

EP 1 096 230 A 5/2001

OTHER PUBLICATIONS

PCT, Translation of the International Preliminary Report on Patentability, Application No. PCT/EP2008/005610, Jan. 27, 2011.
International Search Report under date of Oct. 14, 2008 in connection with PCT/EP2008/005610.

* cited by examiner

Primary Examiner — Michael J Zanelli
(74) Attorney, Agent, or Firm — Quarles & Brady, LLP

(57) ABSTRACT

A method for determining the driving state of a vehicle in three-dimensional space comprising the steps: sensing of first signals over a specific time period, these signals being based on the first sensor signals which correspond to the three-dimensional acceleration of the vehicle; sensing of seconds signals over the specific time period, these signals being based on the second sensor signals which correspond to the three-dimensional angular rates of the vehicle; calculating the driving state variables of the three-dimensional velocity and/or three-dimensional orientation of the vehicle by integrating the first signals and or the second signals over the specific time period according to the system of equations of motion for the corresponding driving state variables; sensing of one or more third signals which are based on one or more additional third sensor signals with which one or more components of the calculated driving state variables can be determined; and correcting the first and second signals of the specific time period or the calculated driving state variables in such a way that the calculated driving state variables correspond as precisely as possible to the driving state variables determined from the third signals.

20 Claims, 4 Drawing Sheets

DEVICE AND METHOD FOR DETERMINING THE DRIVING STATE OF A VEHICLE

CROSS-REFERENCE TO RELATED APPLICATIONS

This application is a U.S. national phase patent application and claims priority to PCT International Application No. PCT/EP2008/005610 filed on Jul. 9, 2008, which is incorporated herein by reference.

FIELD OF THE INVENTION

The invention relates in general to devices and methods for sensing the driving state of a vehicle, and in particular, to a device and a method for determining the driving state of a vehicle in three-dimensional space.

BACKGROUND OF THE INVENTION

An important task of vehicle dynamic control systems and motor vehicle safety systems is to stabilize the vehicle in critical situations, for instance, when it is skidding. The first systems introduced as a standard for solving this task were anti-lock braking systems (ABS) and anti-slip regulation (ASR), also known commonly as traction control systems (TCS), which act primarily on the longitudinal dynamic behavior of the motor vehicle. As a fundamental expansion, vehicle dynamic control systems were developed that influence the behavior of the vehicle to stabilize it also in lateral dynamically critical situations through controlled measures such as active braking of individual wheels, controlling driving torque for implementing slipping at the wheels, and/or through active steering. Such systems are, for instance, the Electronic Stability Program (ESP) or the Active Front Steering (AFS) for controlled steering intervention from BMW.

All vehicle dynamic control systems must initially determine the driving state of the vehicle as precisely as possible, for which motion sensors, among others, are required. The more motion variables and driving state parameters are known, the better and more reliably the driving state can be fundamentally calculated, and the more effectively and safely undesired vehicle behavior can be counteracted. For example, the plausibility of a calculated driving state can be checked with additionally known motion variables. Furthermore, in extraordinary driving situations, for instance extremely steep curves, it may no longer be possible to ensure control and with it stabilization of the vehicle without using such further motion variables. For this however, as a rule further motion sensors are necessary which drive up the costs of a vehicle dynamic control system or safety system. This is the reason for a fundamental endeavor of the manufacturers of such systems to keep the number of necessary sensor elements as low as possible, especially as it is necessary to design these partly redundant for safety reasons, at least for the most important motion sensors, so that for measuring each additional motion variable two sensor elements must be included at correspondingly increased costs.

It is known to determine the driving state based on models, such as observers, for instance tire models, etc. DE 10 2007 047 337 A1 for example, discloses a device and a method in which the transverse velocity of the vehicle is calculated from the measurement of the transverse acceleration using a tire model. The accuracy of the calculation of transverse velocity can be further improved by adding correction variables, for instance the vehicle longitudinal velocity and the yaw rate.

It is further known to determine the direct absolute velocity of the vehicle using a GPS measurement system, as is disclosed DE 101 48 667 C2, for example. The GPS signal, and hence values calculated from the GPS signal, such as the absolute velocity of the vehicle are subject to a certain time delay, and consequently are not well suited for vehicle dynamic control systems, which require driving state information every 5 to 25 ms. Accurate and fast GPS systems, which for example use multiple antennas are not only expensive, but nonetheless still comprise a certain time delay. With multiple antennas it is possible to determine the orientation of the vehicle. However, this means a higher expenditure.

Starting from this background, the object of the present invention is to provide devices and methods that permit optimizing the determination of the driving state of the vehicle, particularly with respect to accuracy, safety, dynamics and costs.

BRIEF DESCRIPTION OF THE INVENTION

The invention, according to a first aspect, provides a method for determining the driving state of a vehicle in three-dimensional space, wherein the method comprises the steps: sensing of first signals over a specific time period, these signals being based on the first sensor signals which correspond to the three-dimensional acceleration of the vehicle; sensing of seconds signals over the specific time period, these signals being based on the second sensor signals which correspond to the three-dimensional angular rates of the vehicle; calculating the driving state variables of the three-dimensional velocity and/or three-dimensional orientation of the vehicle by integrating the first signals and or the second signals over the specific time period according to the system of equations of motion for the corresponding driving state variables; sensing of one or more third signals which are based on one or more additional third sensor signals with which one or more components of the calculated driving state variables can be determined; and correcting the first and second signals of the specific time period or the calculated driving state variables in such a way that the calculated driving state variables correspond as precisely as possible to the driving state variables determined from the third signals.

According to a further aspect, the invention provides a device for determining the driving state of a vehicle in three-dimensional space comprising: an inertial sensor system that is designed to issue acceleration signals which correspond to the acceleration of the vehicle in three-dimensional space, and to issue angular rate signals that correspond to the angular rates of the vehicle in three-dimensional space; a means for calculating driving state variables of the three-dimensional velocity and/or three-dimensional orientation of the vehicle by integrating the acceleration signals and the angular rate signals over a specific time period according to the system of equations of motion for the corresponding driving state variables; a means for issuing one or more additional sensor signals with which one or more components of a calculated driving state, variables can be determined; and a correction means for correcting the acceleration signals and angular rate signals of the specific time period or the calculated driving state variables such that the calculated driving state variables correspond as exactly as possible to the driving state variables determined from the additional sensor signals.

Further features and aspects of the invention are given in the dependent claims, the following description of preferred embodiments and in the accompanying drawings.

BRIEF DESCRIPTION OF THE DRAWINGS

The invention is now explained in more detail based on preferred exemplary embodiments and the accompanying exemplary drawings. They show.

DESCRIPTION OF PREFERRED EMBODIMENTS

Figure 1:
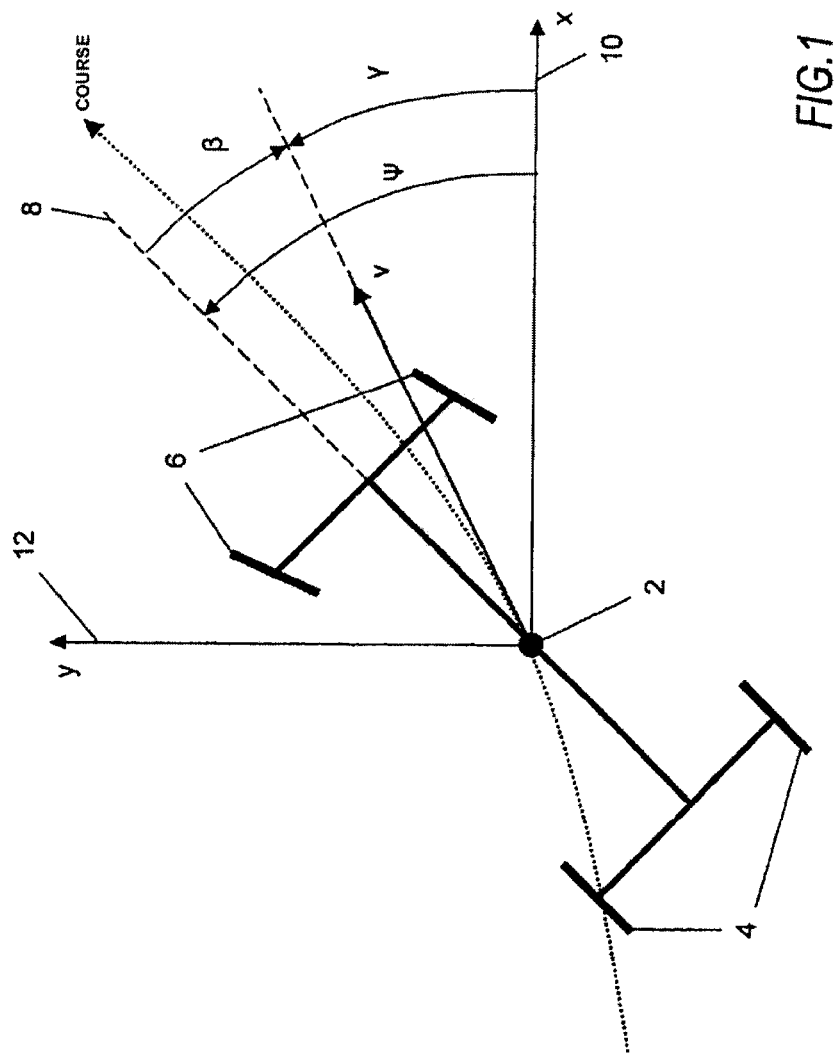
FIG. 1 a schematic representation of the vehicle motion variables.

FIG. 1 shows the driving state of a vehicle and the side slip angle of the vehicle.

Before a detailed description of FIG. 1, first, general explanations of the embodiments and their advantages are given.

Vehicle dynamic control systems (also safety systems) require an exact as possible knowledge of the driving state of the vehicle for precise and high-performance function. Important variables for this are, for example, the vehicle longitudinal velocity (for the wheel slip control of ABS, ASR and ESP), the side slip angle described further below (for longitudinal dynamic control that is important for the ESP, for example), the roll angle (for avoiding rollovers), or the vehicle inclination (improved ASR function).

Consequently, in some embodiments, determining the driving state of a vehicle comprises determining the three-dimensional velocity of the vehicle and the alignment or orientation of the vehicle in three-dimensional space. In some embodiments, vehicles are understood to be all vehicles that can be moved on land, in the water and/or in the air, and not just motor vehicles.

The aim of some embodiments is to determine six unknowns, namely the velocity in a three-dimensional spatial coordinate system and the vehicle orientation in this spatial coordinate system, so that for all practical purposes, the driving state of the vehicle can be completely described. For solving this system, at least six equations are necessary that together yield a system of equations of motion.

To determine the driving state in some embodiments, a plurality of parameters or measurement variables can generally be used, of which here only the rotation velocities or angular rates of the motor vehicle about different axes in space, the acceleration, the steering angle, the four wheel velocities, the driving torque or the braking pressure are named as examples, wherein a preferred embodiment particularly considers measurement variables that represent motion variables. These are preferably the angular rate in three-dimensional space (relative to the vehicle) and the acceleration of a vehicle in three-dimensional space (relative to the vehicle) and, as a supporting variable, a vehicle velocity or a component of the vehicle velocity, for example in an ground-based coordinate system, or other supporting variables such as: acceleration, velocity, position, angular rate and/or orientation of the vehicle in space (relative to earth or vehicle). The vehicle velocity is determined in some embodiments by a wheel speed sensor, a wheel velocity sensor, a radar or based on a position signal or velocity signal of a global positioning system (GPS), wherein the vehicle velocity is provided directly as a signal from the global positioning system or results from a derivative of the position. Also, only individual components of the velocity can be used. The GPS velocity signal is generally based on the evaluation of the Doppler effect. The determined driving state variables, for instance, the vehicle velocity, are used in some embodiments preferably for vehicle dynamic control systems or motor vehicle safety systems, for instance air bag systems or rollover detection systems.

The angular rates are preferably rotation velocities about the main axes of the motor vehicle, that is, about the longitudinal axis, the transverse axis and the vertical axis, which as a rule pass through the center of gravity of the motor vehicle. These motion variables, which are tied to the orthogonal main axis coordinate system of the motor vehicle, can also be designated as canonical motion variables. With respect to the angular rates, the so-called yaw rate describes a rotation of the motor vehicle about its vertical axis, the roll rate describes rotation about the vehicle longitudinal axis, thus a transverse tilting of the vehicle, and the pitch rate describes a rotation about the vehicle transverse axis. With respect to the acceleration variables of the motor vehicle, these are the transverse acceleration, the longitudinal acceleration, and the vertical acceleration, correspondingly along the transverse, longitudinal and vertical axes of the motor vehicle.

In the preferred embodiments, these motion variables are measured using known sensors. For example, transverse acceleration sensors are known that are based on the principle of a bending beam coupled to a capacitor, whereas yaw rate sensors, for example for measuring rotational movement, utilize the Coriolis effect.

In the present description the term sensor is understood in a functional sense, i.e. as a measurement unit that can measure a motion variable, i.e. for instance an angular rate or an acceleration along a direction in space. In one preferred embodiment the sensors used can therefore be designed as individual sensor elements that each comprises a discrete housing, control etc. In another preferred embodiment these sensors are constructed in a so-called sensor cluster that combines some or all sensors of the device into one unit, that is, the individual sensor elements are housed, for instance, in one housing, and can therefore be installed and removed together. For example, such a sensor cluster can comprise yaw, roll, and pitch sensors as angular rate sensors, and transverse, vertical and longitudinal acceleration sensors as acceleration sensors. Furthermore in some embodiments, such a sensor cluster also comprises an appropriate sensor for receiving signals from a global positioning system (GPS) so that an absolute velocity and/or position of the vehicle can also be determined.

Accordingly, one preferred embodiment comprises a total of six sensors, namely three angular rate sensors along the main axes of the vehicle, and in particular, a yaw, roll and pitch rate sensor, and additionally three acceleration sensors, namely a longitudinal, transverse and vertical acceleration sensor. The combination of these sensors in some embodiments is also collectively designated as inertial sensor system, which expresses the complete sensing of the acceleration and angular rate values in an inertial system of the vehicle.

In some embodiments the transverse acceleration of the vehicle is important for assessing the current driving state; it is possibly used to calculate the so-called side slip angle velocity of the vehicle. This variable is important in some embodiments for assessing the stability of motor vehicles for example, and thus an important parameter for vehicle dynamic control systems. Put simply, the side slip angle acceleration corresponds to the skid velocity of a motor vehicle.

Typically the side slip angle $\beta$ is defined, as represented in FIG. 1 for illustrating the driving state of vehicles, as the difference of the yaw angle $\psi$ and the course angle $\gamma$, wherein the yaw angle ψ corresponds to the angle of rotation of the vehicle about the height axis, thus about a vertical axis through the vehicle center of gravity 2, and the course angle γ defines the direction of motion of the center of gravity of the motor vehicle. The yaw angle ψ is measured with respect to a coordinate axis 10, that is, the X-axis, and thus indicates the angular position of the vehicle longitudinal axis 8 with respect to this axis 10. The course angle γ in contrast describes the alignment of the velocity vector v of the center of gravity 2 of the motor vehicle, which is tangential to the course of the motor vehicle with respect to the same coordinate axis 10. The deviations of these two angles or their angular velocities are a measure for the drift or skid of the motor vehicle. These are typically independent of the selection of a specific coordinate system 10, 12. In addition, the reference characters 4 and 6 in FIG. 1 designate the wheel position of the rear and front wheels.

Along with the side slip angle, the slip angle at the rear axle also represents a meaningful control variable.

Until now in the prior art, as initially mentioned, elaborate models are used, particularly for assessing the transverse acceleration and the transverse velocity, and therefore also for determining the side slip angle. In contrast, with some embodiments a particularly high quality and exact description of the driving state is attained in that the driving state is completely described, thereby obviating the use of models.

It has been recognized that the driving state of the vehicle can be (completely) determined using the accelerations in three-dimensional space and the angular rates of a vehicle in three-dimensional space. Consequently, in some embodiments, which relate for example to a method for determining the driving state of a vehicle in three-dimensional space, first signals based on first sensor signals that correspond to this three-dimensional acceleration of a vehicle are sensed over a specific time period, and second signals based on second sensor signals that correspond to the three-dimensional angular rate of the vehicle are sensed over the specific time period. The three-dimensional acceleration comprises, for instance, the transverse, longitudinal and vertical acceleration of the vehicle which are obtained from appropriate sensor signals, that is, the sensor signals are representative of the transverse, longitudinal and vertical acceleration of the vehicle. Accordingly the three-dimensional angular rate comprises the yaw, roll and pitch rate of a vehicle, and the second sensor signals are accordingly representative for the yaw, roll and pitch rate of the vehicle. This ultimately states that in some embodiments corresponding transverse acceleration and angular rate components can be derived as first and second signals from the sensor signals, for example for each spatial direction of an appropriate coordinate system, for instance the inertial system of the vehicle.

Consequently, in some embodiments, a six dimensional description of the vehicle at a specific point in time is available from sensing the first and second signals over a specific period in time, and thus for instance the acceleration values and angular rate values in three-dimensional space of the vehicle. From this, an appropriate (six dimensional) system of equations of motion can be derived that comprises the three-dimensional components of the acceleration and the three-dimensional components of the angular rate of the vehicle. If now the individual measurement points, that is the first and second signals recorded over time which are based on the respective sensor signals, and which correspond to the three-dimensional acceleration of the vehicle and the three-dimensional angular rate of the vehicle, are integrated or added considering gravitational acceleration, then the "six dimensional" system of equations of motion is solved by the integration, and thereby a three-dimensional (vehicle) velocity (by integration of the acceleration values) and a three-dimensional orientation of the vehicle in space (by integration of the angular rates) are determined as driving state variables.

Figure 2:
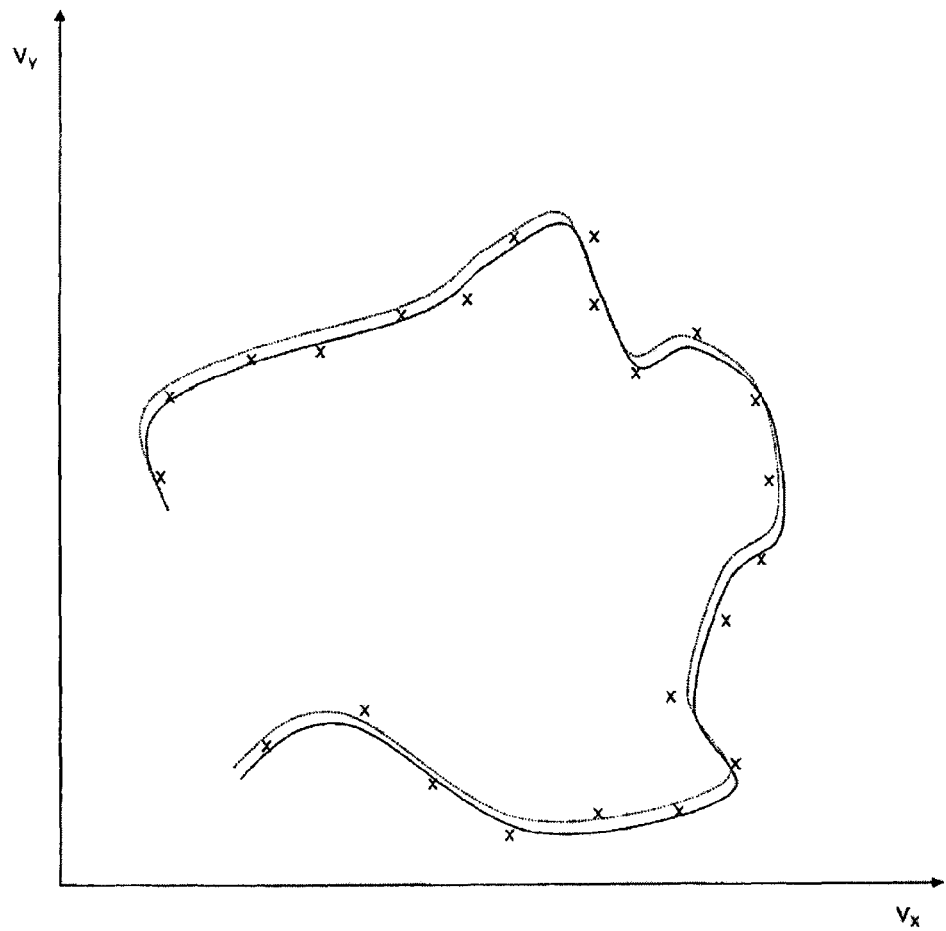
FIG. 2 a schematic representation of the velocity progression of a vehicle.

If the temporal progression of the velocity components of a vehicle in the x and y directions, which are orthogonal to each other, are now considered in a plane, then the actual velocity progression in the two-dimensional space results, as represented for example as the solid line in FIG. 2. The progression attained through the integration is represented in the example as a dotted line. As seen in FIG. 2, a certain discrepancy exists between the actual and the calculated velocity progression of the vehicle. This is due to the fact that measurement errors of the sensors are summed in the course of integration, and as a result, the calculated velocity based on sensor signals no longer coincides with the actual velocity. The same is true for the orientation of a vehicle in space.

Some embodiments approach this problem by taking into account an "objective" driving state variable, for example, an "objective" value of the velocity or an "objective" position of the vehicle, for example, a velocity component or a position component of the vehicle. For instance the sensor signal of a global positioning system yields such a value that indicates an absolute position, or depending on the quality of the received signal, at least a direction of the vehicle or the absolute velocity of the vehicle or a velocity component. Naturally, the velocity of the vehicle can be calculated from the derivative of the position which is represented by the sensor signal. In some embodiments, the "objective" vehicle velocity can also be determined using a sensor signal of a wheel speed sensor or a wheel velocity sensor, a radar or of an optical sensor, and these can be used as supporting variables or correction variables. This means that a third signal or several third signals are sensed which are based on one or more additional third sensor signals, with which one or more components of the calculated driving state variables can be determined. Overall, in some embodiments, "objective" determined driving state variables or their components can be considered as support variables or correction variables which correspond at least to one of the following variables or are derived from them: acceleration, velocity, position, angular rate and/or orientation of the vehicle.

In FIG. 2, the Xs near the actual velocity curve symbolize such "objective" measurement points, which can acquired, for instance from the GPS sensor signal. The GPS sensor signals are temporally offset from the actual driving state of the vehicle due to, among other reasons, the signal propagation time, i.e., the measurement point attained from the GPS is earlier than the time point at which one actually receives the position or velocity value. In some embodiments, the velocity component of a vehicle obtained from the solution of the system of equations of motion is adjusted using the corresponding velocity component which is obtained by sensing the sensor signals, which correspond at least to one velocity component or position component of the vehicle. Therefore the sensor errors which are accumulated over time can be compensated for and the calculated driving state (e.g., three-dimensional vehicle velocity and three-dimensional orientation of the vehicle in space) corresponds nearly perfectly with the actual driving state. In FIG. 2 this would mean that the dotted line coincides with the solid line.

Generally stated this means that the first and the second signals of the specific time period or the calculated driving state variables are corrected such that the calculated driving state variables correspond as exactly as possible to the third signals of the specific driving state variables. In doing so, in some embodiments the driving state variables of the three-dimensional velocity and/or three-dimensional orientation of the vehicle are re-calculated using integration over the specific time period of the corrected first and the corrected second signals according to the system of equations of motion for the corresponding driving state variables. For example, the first and second signals are corrected or adapted so that the driving state variables calculated from the solution of the equations of motion of the corresponding driving state variables correspond as exactly as possible to the driving state variables determined from the third signals. This way, the offset error of the measurement variables is determined and consequently it is possible to correct the sensor offset, among others.

Alternatively the calculated driving state variables are directly adjusted using the driving state variables determined from the third signals. This alternative directly yields the corrected driving state variables. Yet another way to perform the correction is to initially calculate the error of the driving state variables, and to infer from that the corrected driving state variables. These alternatives can also be combined with each other. For example, the driving state variable velocity can be corrected directly based on the driving state variables determined from the third signals, whereas for the driving state variable orientation, initially the orientation error is calculated, and then the corrected orientation is calculated from this.

The specific time period over which the first and second signals are sensed can be selected arbitrarily, and in some embodiments depends on a parameter. One such parameter is the availability of the third signal, for instance, or the quality of the first and/or second signals, the quality requirements of the precision of the driving state, etc. For example, the acceleration sensors and angular rate sensors supply larger values when the vehicle performs corresponding movements in three-dimensional space (e.g., driving on curving mountain routes). With large accelerations and angular rates the specified time period can be shorter, for instance, than with small accelerations or angular rates of the vehicle (e.g. driving a straight course), because in the first case the quality of the signals can be assumed to be higher than the quality of the signals in the second case.

In some embodiments the first and second signals obtained in the past and the resulting calculated progression of the calculated driving state variables are corrected up to a specific point in time in the past so that the calculated driving state variables correspond as exactly as possible to the driving state variables determined from the third signals, for instance velocity or position of the vehicle. This way, the errors which creep in over time due to the addition of inaccurate sensor signals for the acceleration and the angular rate, can be eliminated.

In some embodiments all three velocity components and position components of the calculated driving state variables that are required for a complete three-dimensional description are adjusted or corrected, so that an extremely precise description of the driving state is available in three-dimensional space, even for the past. As a result, not only the current vehicle velocity but rather the complete velocity vector of the vehicle and additionally also the exact orientation of the vehicle in space are also known precisely for the past and for the present, and can be known, because the sensors are very well adjusted, and can continue to be integrated for a long time. If for example, third signals are temporarily unavailable for adjusting the calculated driving state variables, then the driving state variables can be nevertheless determined by integration over the time. Incidentally, the side slip angle and the role angle derived from these are also known precisely, so that the relatively large inclination of a motorcycle, for example, can be precisely determined.

Furthermore, based on recording the temporal progression of the calculated driving state variables of the vehicle, for instance the progression of velocity, it is inconsequential if the GPS signal is poor or unavailable for a certain time, because then the driving state is still known relatively precisely. As soon as the GPS signal is available again it can be used in some embodiments as support as the third signal for determining the driving state.

The above method, in some embodiments, can manage even without the GPS signal in that the vehicle velocity for example is determined by a wheel speed sensor or wheel velocity sensor. In such embodiments, the vehicle velocity is not known as precisely as in those embodiments using the GPS signal. However here too, the driving this date can be determined sufficiently precisely so that the determination of the driving state is sufficient for an ESP system, for example.

The course of the method according to some embodiments can be summarized again as follows: as input variables three accelerations are used, which are described in space of the vehicle coordinate system, that are either measured directly or are available as derived variables; furthermore, three angular rates, which are determined in the space of the vehicle coordinate system, are used that are either measured directly or are available as derived variables; and finally, a velocity in space (e.g. GPS ground-based coordinate system) or individual components of the velocity in space (if, only one or two satellites are available, for example) or individual components of the velocity in the vehicle coordinate system or also the position are used, wherein the derivative of the velocity yields the position.

Then, as represented above, the driving state is described in three-dimensional space so that the following information is available or can be derived:
three angular rates,
three velocities (value and orientation) and from them, the course angle
three angles, and from them the orientation of the vehicle
three accelerations
three positions (if GPS is used as a reference)

All variables can be represented in any axes (vehicle-based coordinates, or ground-based coordinates), so that an exact knowledge of the driving state can be provided. Naturally, all variables can be translated to any arbitrary positions within the vehicle, and are available in the vehicle coordinate system or also in the ground-based coordinate system.

A further advantage of the method is that it can be used to determine the position of the rear axle and therefore, can make it possible for example, to control the slip angle at the rear axle, without having to know the installation position of the rear axle as a parameter. Also, in contrast to other known methods, the knowledge of the position of the vehicle's center of gravity is not required. That is, in some embodiments the driving state variables can be determined at a first point, for example the position of the sensor within the vehicle. Based on the driving state variables determined for this first point and based on known driving state variables of a second point, for example the rear axle of the vehicle, the position of the second point relative to the first point is then calculated, that is, the relative position of the sensors with respect to the rear axle. An advance application of the installation position of the control device and the position of the rear axle is unnecessary. The system therefore locates the rear axle and incorporates itself effectively. The same is also possible for determining the relative position of the front axle, if additionally the steering angle is known, for example.

Naturally, the physical variables can also be translated into one another. Thus, in some embodiments the differentiation of the GPS velocity yields the acceleration of a vehicle in three-dimensional space. The vehicle orientation can therefore be determined by bringing the acceleration measured with the inertial sensor system into agreement with the calculated acceleration. The measurement of the velocities in space also provides the history of acceleration in space by means of differentiation. Next, the vehicle orientation (in space) at a specific point in time is calculated so that the progression of the vehicle motion integrated using the inertial sensor system yields a history of the acceleration that is in the "best possible" agreement with the acceleration history of the GPS measurements. Then the orientation of the vehicle in space is determined so that the course of the velocity calculated using integration is brought into agreement with the course of the measured GPS velocity. As explained above, in some embodiments a comparison with the position is also performed. Embodiments that use vehicle specific velocities (for example, determined using wheel speed sensors or wheel velocity sensors) solve the problem in the same manner, however, in a different coordinate system.

Some embodiments consider the time difference between the provision of the sensor signals from the global positioning system (GPS) and the measurement and the measurement time points of the sensor signals. This can occur by assigning temporally connected variables to each other in the solution of the system of equations of motion, that is, the third signals are temporally assigned to first and second signals. If for example the signals belonging to the angular rates were recorded in a specific time period and the signals belonging to the accelerations were recorded in the specific time period, then for instance, in some embodiments the end of the recording time period coincides with the measurement time point of the GPS signal.

In some embodiments all driving state variables are transformed so that they relate to a common position, for example within the vehicle. That means the inertial systems or coordinate systems in which the driving state variables are determined have the same origin, or even coincide. The person skilled in the art fundamentally knows how corresponding physical variables can be transformed into different coordinate systems having different origins.

In some embodiments an error of the first (for example, acceleration sensor) and/or a second sensor (for example angular rate sensor), from which the first and second signals originate, is recognized from the deviation between the determined driving state variables and the calculated driving state variables. This is possible because with correct functioning of the sensors, for example, normally the determined velocity progression can be adapted to the objective velocities in the ground-based coordinate system. If this adaptation fails, a failure of the sensor is indicated, for example.

With some embodiments the driving state variables are determined during a stable driving state, e.g. the system of equations of motion is solved during a stable driving state. A stable driving state exists when the vehicle is not slipping, i.e., has a zero side slip angle. In particular when the vehicle travels in curves, the acceleration sensors deliver larger and thereby also more reliable values than during travel in a straight line, so that these values can be assigned a higher reliability (for example, by a corresponding weighting factor) for the solution of the system of equations of motion, for instance. In contrast, upon starting the vehicle, the driving state is also stable and well known. This information can also be used as a starting value when solving the system of equations of motion or for the integration of the first and second signals.

In some embodiments, signals based on sensor signals that indicate the alignment of a vehicle relative to the earth's magnetic field are recorded additionally or exclusively as third measurement variable. These sensor signals can originate, for example, from a gyro compass or a magnetic compass that is already present in ships or aircraft. Thereby it is also possible to completely determine the "driving state" of an aircraft or ship.

Some example embodiments relate to a device for determining the driving state of a vehicle in three-dimensional space. One such device comprises for example an inertial sensor system that is designed to issue acceleration signals that specify the acceleration of the vehicle in three-dimensional space, and to issue angular rate signals that specify the angular rate of the vehicle in three-dimensional space. Such an inertial sensor system can be designated as a 6-D sensor system because it senses six components of the driving state of the vehicle (three acceleration components and three angular rate components, as already described above). Furthermore, in some embodiments the device comprises a means for determining the driving state variables of three-dimensional velocity and/or three-dimensional orientation of the vehicle by integration of the acceleration signals and the angular rate signals over a specific time period according to the system of equations of motion for the appropriate driving state variables. In addition, in some embodiments the device comprises a means for issuing one or more additional sensor signals with which one or more components of the calculated driving state variables can be determined, i.e. in some embodiments the means comprises a GPS sensor and/or a wheel speed sensor and/or a wheel velocity sensor and/or a radar and/or an optical sensor. The device also comprises a correction means for correcting the acceleration signals and the angular rate signals of the specific time period or of the calculated driving state variables such that the calculated driving state variables correspond as closely as possible to the driving state variables determined from the additional sensor signals.

In some embodiments the device is designed so that the calculated driving state variables correspond to at least one of the following variables: acceleration, velocity, position, angular rate and/or orientation of the vehicle. Naturally the specific driving state variable can also be only a component of the list of variables, as already described above.

The device is designed in some embodiments such that it can perform all of the above listed features of embodiments. This is achieved in some embodiments in that appropriate means are provided which are designed so that they can perform corresponding features of the above embodiments. Some embodiments comprise a microprocessor which can be appropriately programmed to perform the above features of the embodiment.

Some embodiments of the device can be designed to be very compact, and to be positioned in arbitrary vehicles at an arbitrary location within the vehicle. With some embodiments the driving state variables and/or the sensed signals can then be transformed into the appropriate coordinate system which has its origin at the installation location within the vehicle, for example. In some embodiments the sensors of the inertial sensors are located at different locations. In such embodiments then the appropriate transformations of the signals are performed so that for example the first and second signals relate to the position of the installation location of the device within the vehicle, as was already described above.

The results provided according to the embodiments of the invention using the above named methods and devices, are not model variables based on hypotheses (as is the case with current vehicle dynamic control systems), but rather they deliver particularly accurate driving state variables. The driving state description is comprehensive, i.e. nearly without gaps (all directions, angular rates, angles, velocities of the vehicle). The driving state information is furthermore time synchronous in some embodiments, i.e. there is no time delay between the temporal assignment and the driving state variables being made available. In some embodiments the sensor signals can be compensated for (offset and sensitivity) without use of further measurement variables (or model variables). Furthermore, an efficient monitoring of sensors is guaranteed.

Some embodiments function as indicated above even with poor GPS reception: the embodiment is functional and delivers appropriate driving state information even if only a few satellites are present (e.g. only one). In some embodiments the evaluation of the GPS signal can be improved because the velocity in space is already available at higher quality.

GPS signals are distorted for instance due to reflections from walls and high buildings for example, and then cannot be directly received. As a result a falsified component of the vehicle velocity in space is calculated. Consequently, in some embodiments every satellite signal is checked for quality and only the best satellites are used in order to support the method, and signals having reflections can be reliably recognized and excluded. Therefore, in some embodiments it is possible to check the tracking of a high quality velocity in space (e.g. in the case of poorly received GPS) to determine whether the velocity components provided by the GPS are plausible or not. If the GPS information at a measurement point is not plausible, then in some embodiments this information can be removed from the calculation or can be provided with a very low weighting factor.

With some embodiments is it also possible to reliably detect and control over-steering situations and rollover situations without having to rely on a steering wheel angle because the six dimensional driving condition is precisely determined.

Because in some embodiments of the method the information of an expandable time period, i.e. of a specific time period, is used, measurement points can be missing, i.e. it is not sufficient if only individual components of the velocity can be provided by the GPS. This occurs for instance when the GPS reception is poor; that is, if only one satellite is available, for example, then only the velocity component in the satellite direction is known. If there are sufficient measurement points available over a specific time period, then sufficient information is available to solve the system of equations, even if the GPS measurement contains gaps. Accordingly, temporal gaps in the GPS signal as well as shortfalls of components of the 3-D information of the GPS velocity are both inconsequential.

Figure 3:
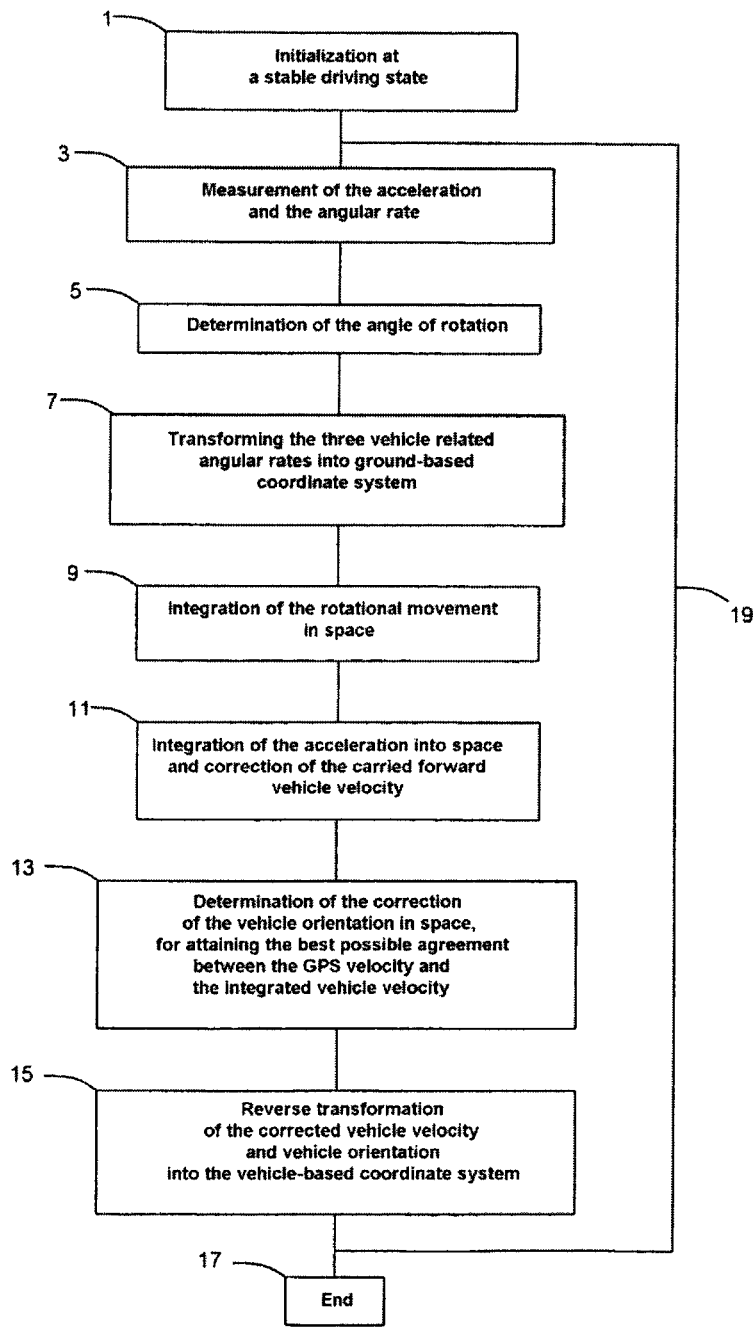
FIG. 3 a flow diagram of a method according to a preferred embodiment.

FIG. 3 shows a method according to one embodiment of the present invention. The method is initialized in step 1 during a stable driving state (for example, static straight travel), in which it can be assumed that the vehicle orientation coincides with the velocity vector. In step 3, the acceleration and the angular rates of a vehicle are measured, for example using a 6-D sensor system, so that three components of the acceleration (longitudinal, transverse and vertical acceleration) and three components of the angular rates (roll, pitch and yaw rate) are available. The angle of rotation about the vehicle longitudinal axis is determined in step 5, by reconciling the measured acceleration (including gravity) with the model transverse acceleration corresponding to a stable manner of driving. Therefore, the vehicle orientation in space and vehicle velocity in space are known at this point. Then in step 7, the three vehicle-related angular rates are transformed into the ground-based coordinate system. In step 9 the new orientation in space is calculated by integrating the rotational movement in space.

Starting from the vehicle velocity in space that is carried forward, this can be further determined by integrating the acceleration measurement in step 11 (after the measured acceleration in spatial coordinate system was transformed into the vehicle coordinate system). If the calculated velocity in space slowly drifts from the GPS measurement, then in step 13 the correction of the vehicle orientation in space is determined which is necessary in order to attain a best possible agreement of the GPS velocity and the integration velocity. In step 15, the velocity and vehicle orientation in space calculated after the correction can now be transformed back into the vehicle-based coordinate system, or any arbitrary coordinate system (e.g. at the wheel contact points) using coordinate transformation. The method would terminate in step 17, if it is not performed in loops, as indicated by the corresponding connection 19, so that the current corrected driving condition is always available.

Ultimately, it is the goal to determine six unknowns, namely the velocity in a spatial coordinate system and the vehicle orientation in the spatial coordinate system. To support this goal, any information about velocity or position of the vehicle that originates from a GPS system, for example, or from a sensor which directly or indirectly measures the velocity of the vehicle, is sufficient. Ultimately, it must be possible to construct at least six equations. Even if only one piece of information is available for support, by considering a longer period, it is still possible to create an over-determined system of equations.

As already explained, at least six equations are necessary for solving this system that together yield a system of equations of motion. Even if a GPS module provides a velocity in space only once per second (velocity North, velocity East, velocity height), then after two seconds sufficient data is already available for solving the system of equations of motion because six velocity measurements are available.

After the third second, in this example, the system of equations of motion is over-determined. If the period of the last seconds is used to build the system of equations of motion then in some embodiments a least squares approximation, for example, yields exact velocity information in space.

The time delay in providing the GPS measurement is considered in a further form of the embodiment, for example in that time correlated variables are processed for the equations in the system of equations. The following example is used for illustration purposes: The system knows (or calculates) the time delay of the GPS measurement and the point in time at which the GPS makes the information available (for example, once per second). If the GPS measurement has a provisioning delay of 0.7 seconds between measuring and providing, for example, then 0.3 seconds after the previous GPS transmission of the value, the integrated velocity is stored, and the system of equations is created only 0.7 seconds later. Despite this, the exact velocity is continuously available with great accuracy because in the interim the movement of the vehicle in space is integrated on the basis of a very exact knowledge of the vehicle orientation and velocity.

Figure 4:
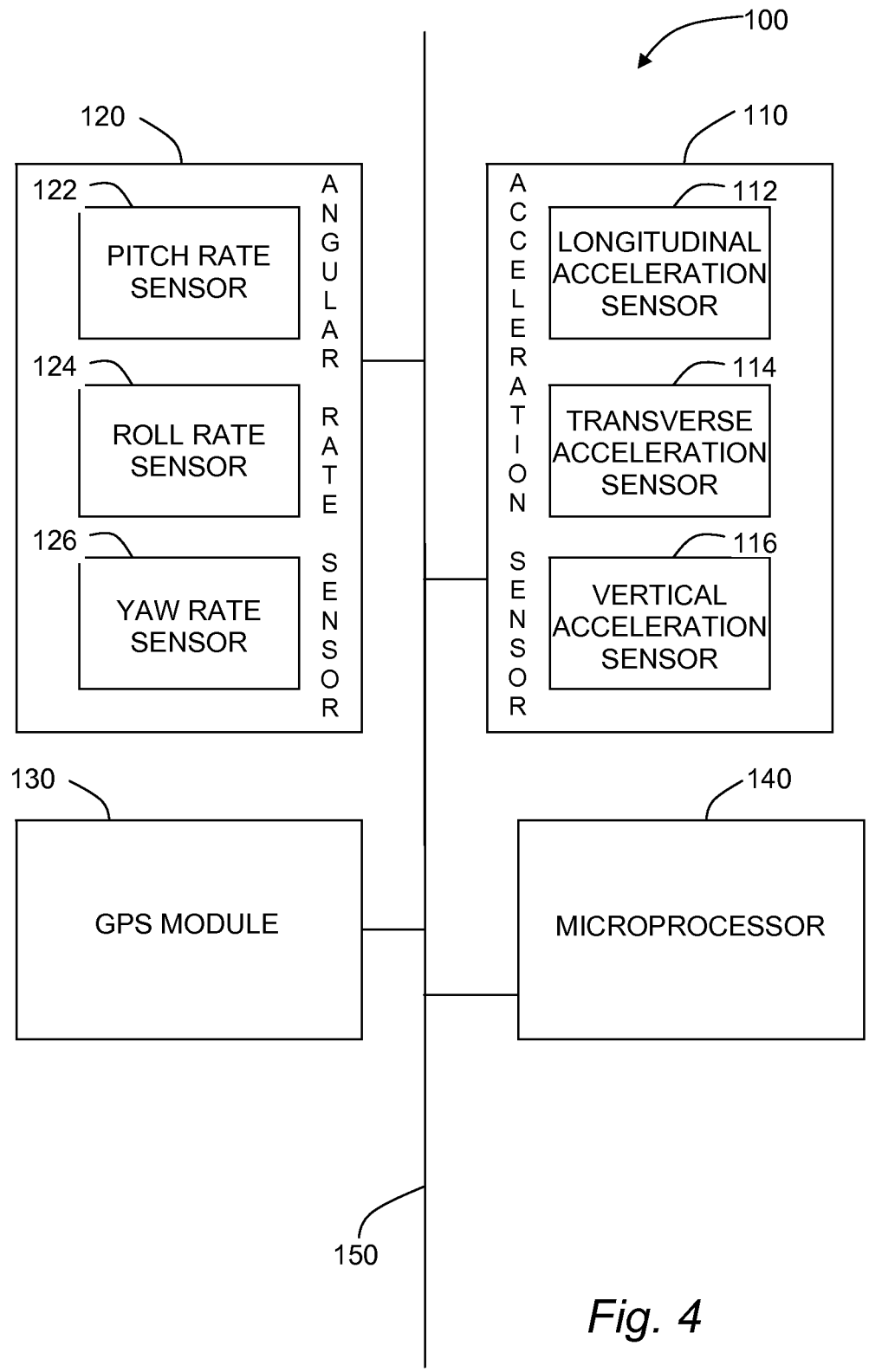
FIG. 4 a schematic representation of the components of a device according to a preferred embodiment.

In FIG. 4 one embodiment of the device 100 for a complete determination of the driving state of a vehicle in three-dimensional space is represented schematically. The device 100 comprises an acceleration sensor 110 and an angular rate sensor 120, which together form an inertial sensor system. The acceleration sensor 110 contains a longitudinal acceleration sensor 112, a transverse acceleration sensor 114, and a vertical acceleration sensor 116, which each provide a signal that is representative for the transverse, lateral and vertical acceleration of the vehicle. Thus, the signals describe the acceleration of a vehicle in three-dimensional space. The signals from the acceleration sensor are provided to a signal line 150 so that they can be processed by a microprocessor 140. The angular rate sensor contains a pitch rate sensor 122, a roll rate sensor 124, and a yaw rate sensor 126, which each issue a signal that is representative for the pitch, roll and yaw rate of the vehicle. Thus, the signals describe the angular rates of a vehicle in three-dimensional space. The angular rate sensor 120 also provides the signals to the signal line 150.

The device 100 further comprises a GPS sensor 130 which can receive GPS signals and is connected for example to one (or several) antenna(s). The GPS sensor 130 provides, for instance, a signal to the signal line 150 that is representative of the velocity or the position of the vehicle.

The microprocessor finally processes the signals, as was described further above and as illustrated in the embodiment according to FIG. 3. Thus, the microprocessor 140 integrates the acceleration signals and angular rate signals in order to solve the fundamental system of equations of motion, and to calculate the corresponding driving state variables, namely three-dimensional vehicle velocity and three-dimensional orientation in space. The vehicle velocity resulting from this is then compared with the vehicle velocity obtained using the GPS sensor 130, and if necessary corrected. The correction occurs, as was already explained above, in that the variables for the system of equations of motion, namely the acceleration signals and angular rate signals are then modified, so that the solution of the system of equations of motion, namely the new vehicle velocity, agrees with the velocity of the GPS module 130. The device 100 can send the information, for instance, about the driving state via the signal line 150, for example to a vehicle dynamic control system in an automobile or to an ESP system, ACC system, airbag system, etc., for example.

Naturally there are also embodiments of the device 100 that can implement each of the features of the embodiments described above that relate to the method. This is possible, for example, by programming or appropriate design of the microprocessor 140.

Naturally embodiments also exist with arbitrary arrangements of the sensors; for example the entire inertial sensor system can even be housed in the GPS module. In some embodiments of the device 100, a Kalman filter is used for determining the driving state.

Naturally the other signals (mentioned above) can also be used to correct or support, for instance the position provided by the GPS, or the velocity which was determined by a wheel speed sensor or wheel velocity sensor.

In some embodiments of the device 100 a compensation of the sensors is possible using an analysis of the corrections, because after receiving a new GPS measurement value, the correction of the vehicle orientation in space is calculated. In periods with low angular rates, for instance in the case of travel in a straight line, a regular correction of the orientation about a specific vehicle axis means that a corresponding angular rate has, or can have, a certain offset. If corrections are necessary only at higher angular rates, then in some embodiments the correction can be assigned to a scaling deviation, and a corresponding scaling correction can be performed based upon this information. In the same way, in some embodiments the acceleration sensors can be compensated for if regular corrections of the velocities are noticed in dominant directions.

Some embodiments are characterized by a high intrinsic safety: if one of the inertial sensors has an error, then it is no longer possible to determine an orientation of the vehicle in space with which the progressions of integrated movement and measured movement can be brought into agreement, whereby a corresponding sensor error can be identified.

In embodiments having extreme quality requirements of the determination of the driving state (e.g., instantaneous error detection) a further sensor can be additionally provided for an angular rate and/or acceleration that makes redundancy possible, with which any error of any sensor is recognized. For example, an angular rate sensor and an acceleration sensor cover the redundancy of all sensors.

In some embodiments the inertial sensor system, or the device 100, can be installed at any location and in any orientation in the vehicle because the system on its own is capable of determining the orientation relative to the vehicle axes due to the availability of the complete sensing of the driving state. For ensuring high quality function, in some embodiments the measured GPS velocity is transformed to the location of the installation site of the inertial sensor system in the vehicle. In some embodiments, all variables are transformed to a common point in the vehicle.

In some embodiments the sensors 110, 120, 130 of the device 100 or the sensors of the inertial sensor system are installed almost at a single location or near each other. In some embodiments, in which the sensors are installed farther apart from each other due to special boundary conditions, all of these signals are transformed, based on the available angular rate in space, so that they relate to a common position.

In some embodiments, in contrast to known controllers of lateral dynamics, a steering angle is no longer necessary to allow for a robust description of the driving state and a robust and safe lateral dynamic control and rollover control without a steering angle. In some embodiments, the steering angle is used additionally to better interpret the driver's intent. Consequently, in some embodiments it is possible to design the controller robustly against errors of a steering angle, if the steering angle is used as information regarding the driver's intent. Control systems to date have gone to great efforts to monitor the steering angle signal very efficiently. These efforts are not needed, for example in the embodiments that do not use a steering angle sensor.

ABS controllers according to the prior art insufficiently brake the wheels at regular intervals for permitting a reliable determination of the vehicle longitudinal velocity. A disadvantage of this procedure is that insufficiently braking the wheels leads to extending the stopping distance. This disadvantage does not exist with some embodiments because the velocity is always available at high quality. Therefore, the wheel slip values can be adjusted very precisely so that the optimal delay and steerability of the vehicle is attained.

All wheel drive vehicles present a special problem that in some driving cases all wheels can be skidding synchronously. The ASR controller must ensure that the wheel slip is not too large. However, the ASR controller according to the prior art has the problem that the determination of velocity based on the wheel velocities no longer provides the correct vehicle longitudinal velocity; it is an estimated variable with corresponding uncertainties. If the velocity estimate is too high then the ASR controller permits too much slip which negatively affects the vehicle stability. If the velocity estimate is too low, then too little slip is adjusted for which then leads to lack of traction. These difficulties can also be eliminated at least to some extent by some embodiments because the actual vehicle velocity is available accurately, for instance, to the ASR controller.

Vehicle dynamic control systems according to the prior art, as described initially, depend mostly on complex models to describe the driving state. An adequate description of the driving state is then possible only if the vehicle parameters (the model parameter) are available with sufficient quality. The consequence is that in the case of aging or retrofitting (key word: "tuning") the vehicle, the parameterization is no longer correct. This leads to deteriorating control quality. If a vehicle owner, for instance, mounts wheels having a different diameter, then the calculated travel velocity no longer coincides with reality, which results in a deterioration of control quality. This difficulty is avoided in some embodiments because no model parameters or parameters that depend directly on the vehicle (tire diameter, for instance) are required for determining the driving state. In some embodiments, in which vehicle parameters are still necessary for a controller, the possibility exists to constantly update the parameters (e.g. the tire diameter) during the course of the vehicle life, based on the complete knowledge of the vehicle state.

In some embodiments in which the driving state is available not only in vehicle-based coordinate systems but also in ground-based coordinate systems, a more targeted control can occur by consulting GPS map material. The controller can provide an enhanced support, for example, which aids the driver in returning the vehicle to the longitudinal direction of the road. Alternatively, in some embodiments the driver is warned if the driving state known in space is no longer adapted to the road.

In some embodiments, possible filter coefficients (or amplifications) are designed to be situation dependent. For example, in the case of good GPS satellite availability, the support is enhanced, that is, the vehicle velocity or position obtained from the GPS is particularly reliable and can consequently be used frequently for correction. In contrast, in the case that only few satellites are available, the time period considered for the method is prolonged to collect more data and to more strongly over-determine the system of equations of motion. Every individual support point (or velocity derived directly or indirectly from the GPS signal or the wheel speed sensor or wheel velocity sensor) can be incorporated into the calculation with an adapted weighting, depending on the reliability of the corresponding information.

In some embodiments the startup procedure can be followed very exactly because the driving direction is immediately available with the inertial sensor system so that specific wheel speed sensors detecting the direction of wheel rotation, for instance, are unnecessary.

In some embodiments the time delay between GPS measurement and inertial sensor system is compensated for, for instance, if the GPS velocity is externally provided, for example, via a serial interface to a navigation system.

In some embodiments the quality of the calculated vehicle dynamic variables is determined and is provided as a tolerance, for instance, to the vehicle dynamic control system.

The invention claimed is:

1. A method for determining a driving state of a vehicle in three-dimensional space for vehicle dynamic control of the vehicle, whereby the method is comprised of the steps:
   sensing over a specific time period, first signals that are based on first sensor signals, that correspond to a three-dimensional acceleration of the vehicle;
   sensing over the specific time period, second signals that are based on second sensor signals, that correspond to three-dimensional angular rates of the vehicle;
   calculating the driving state variables of at least one of three-dimensional velocity and three-dimensional orientation of the vehicle by integrating over the specific time period, the first signals and the second signals according to a system of equations of motion for the corresponding driving state variables;
   sensing one or more third signals that are based on one or more additional third sensor signals, from which one or more components of the calculated driving state variables can be determined; and
   correcting at least one of the first and second signals of the specific time period and the calculated driving state variables so that the calculated driving state variables correspond as exactly as possible to the driving state variables determined from the third signals for vehicle dynamic control of the vehicle.

2. The method according to claim 1, in which the driving state variables determined from the third signals correspond to at least one of acceleration, velocity, position, angular rate and orientation of the vehicle.

3. The method according to claim 1, in which the third signals are sensed using a global positioning system (GPS).

4. The method according to claim 1, in which the third signals are sensed using at least one of a wheel speed sensor, a wheel velocity sensor, a radar, and an optical sensor.

5. The method according to claim 1, in which a time difference between a time at which the third sensor signal is available and a measurement point in time of the third sensor signal is considered.

6. The method according to claim 5, in which the consideration of the time difference comprises associating the third signals with the first and second signals.

7. The method according to claim 1, in which the driving state variables are determined at a first point of a vehicle and, based on the driving state variables calculated for this first point, and based on known driving state variables of a second point of the vehicle, a position of the second point relative to the first point is calculated.

8. The method according to claim 1, in which, from a deviation between one of the determined driving state variables and one of the calculated driving state variables, an error is detected of at least one of a first sensor and a second sensor from which the first and second sensor signals respectively originate.

9. The method according to claim 1, in which the driving state variables are calculated during a stable driving state.

10. The method according to claim 1, in which signals based on sensor signals that indicate an alignment of the vehicle relative to a magnetic field of the Earth are sensed at least one of additionally and as an exclusive third measurement variable.

11. A device for determining a driving state of a vehicle in three-dimensional space for vehicle dynamic control of the vehicle, comprising:
   an inertial sensor system configured to issue acceleration signals that correspond to an acceleration of the vehicle in three-dimensional space, and to issue angular rate signals that correspond to angular rates of the vehicle in three-dimensional space;
   means for calculating driving state variables of at least one of a three-dimensional velocity and a three-dimensional orientation of the vehicle by integrating, over a specific time period, the acceleration signals and the angular rate signals according to a system of equations of motion for the corresponding driving state variables;

means for issuing one or more additional sensor signals from which one or more components of the calculated driving state variables can be determined; and correction means for correcting at least one of the acceleration signals and the angular rate signals of the specific time period and the calculated driving state variables such that the calculated driving state variables correspond as closely as possible to the driving state variables determined from the one or more additional sensor signals for vehicle dynamic control of the vehicle.

12. The device according to claim 11, in which the driving state variables determined from the one or more additional sensor signals correspond to at least to one of acceleration, velocity, position, angular rate and orientation of the vehicle.

13. The device according to claim 11, in which the means for issuing one or more additional sensor signals comprises a GPS sensor.

14. The device according to claim 11, in which the means for issuing one or more additional sensor signals comprises at least one of a wheel speed sensor, a wheel velocity sensor, a radar, and an optical sensor.

15. The device according to claim 11, in which the correction means is configured to consider a time difference between a time at which the one or more additional sensor signals are available and a measurement point in time of the one or more additional sensor signals.

16. The device according to claim 15 in which the correction means is configured to consider the time difference by associating the one or more additional sensor signals with the acceleration and angular rate signals.

17. The device according to claim 11 in which the means for issuing one or more additional sensor signals is configured to determine the driving state variables at a first point of the vehicle and, based on the driving state variables calculated for the first point, and based on known driving state variables for a second point of the vehicle, calculating a position of the second point relative to the first point.

18. The device according to claim 11 in which the correction means is configured to detect an error of the inertial sensor system by measuring a deviation between the determined driving state variables and the calculated driving state variables.

19. The device according to claim 11 in which the means for calculating driving state variables is configured to calculate the driving state variables during a stable driving state.

20. The device according to claim 11 in which the inertial sensor system is further configured to issue alignment signals that indicate an alignment of the vehicle relative to a magnetic field of the Earth.

* * * * *